US005081771A

United States Patent [19]

McGregor et al.

[11] Patent Number: 5,081,771

[45] Date of Patent: Jan. 21, 1992

[54] ALIGNMENT TOOL FOR MOUNTING DOOR LOCK ASSEMBLY

[76] Inventors: Donald B. McGregor, 3908 Caxton Ct., San Jose, Calif. 95130; Michael W. Davis, 1722 Whitwood La., Apt. #2, Campbell, Calif. 95008; Russell J. Bernard, 2847 Regnart Way, Santa Clara, Calif. 95051

[21] Appl. No.: 705,559

[22] Filed: May 24, 1991

[51] Int. Cl.[5] .......................... B25H 7/00; G01B 3/14

[52] U.S. Cl. ........................................ 33/667; 33/562; 33/645

[58] Field of Search ................. 33/539, 194, 562, 613, 33/644, 645, 667, 197

[56] References Cited

U.S. PATENT DOCUMENTS

| | | | |
|---|---|---|---|
| 292,463 | 1/1884 | Bassett | 33/197 |
| 513,313 | 1/1894 | Etherington | 33/197 |
| 824,306 | 6/1906 | Means | 33/197 |
| 1,619,695 | 3/1927 | Boese et al. | 33/197 |

*Primary Examiner*—Harry N. Haroian
*Attorney, Agent, or Firm*—N. Kallman

[57] ABSTRACT

An alignment tool for preparing through holes in a door to enable mounting a lock assembly includes a slidable bracket for securely positioning the tool in the mortise at the edge of the door. An angle element is connected to the bracket and to a support plate, which is perpendicularly disposed relative to the bracket. The support plate is formed with precisely positioned guide holes that indicates to the door installer exactly where the through holes are to be made.

10 Claims, 2 Drawing Sheets

ALIGNMENT TOOL FOR MOUNTING DOOR LOCK ASSEMBLY

FIELD OF THE INVENTION

This invention relates to an alignment tool for enabling rapid mounting of a lock assembly to a door.

BACKGROUND OF THE INVENTION

DESCRIPTION OF THE PRIOR ART

Hinged type doors that are provided by door manufacturers and distributors generally have a cylinder bore extending from one side to the other side of the door. The cylinder bore is closely adjacent to the edge of the door and typically has a diameter of about 2 ⅛inches. The prepared door also has a mortise, which is a hollowed space or rectangular groove, formed at the edge of the door adjacent to the cylinder bore. The mortise typically is 2 ¼ inches high, 1 inch wide, and about ⅛ inch deep. The mortise has a flanged section at the inner end which serves as a stop for a strike plate that covers the mortise after a lock assembly has been installed. Within the mortise, a plunger bore or strike bore is formed extending from the edge of the door to the cylinder bore. The plunger bore has a height of approximately one inch. The plunger bore allows a spring-loaded latching mechanism to project to the door frame or jamb and seat in a groove or recess when the door is closed and to retract into the door in response to the turning of a handle when the door needs to be opened.

When mounting a lock assembly to a door, a cylinder portion of the lock, which may include a tumbler, is inserted and seated in the cylinder bore. The lock assembly includes a mounting plate which has two vertically spaced holes that need to be aligned with through holes that are formed in both sides of the door by the installer prior to installation. During attachment of the lock assembly to the door, longitudinal bolts are passed through the through holes at one side of the door to engage threaded nuts at the other side of the door. After a lock is assembled to the door, the rectangular strike plate is inserted in the mortise flush with the edge of the door.

To aid the installer in preparing the door with the necessary through holes, the packages sold with door lock assemblies include a paper or cardboard template which is used by the installer to drill two through holes in the door. The template has markers printed thereon which indicate where the through holes need to be drilled. During installation, the installer places the template on one side of the door and visually aligns vertical and horizontal centerlines of the template with the visually determined centerlines of the cylinder bore and the plunger bore. With the template held manually in place, the through holes are drilled in one side of the door. The installer then shifts the template to the other side of the door and uses it to drill corresponding holes that must be in alignment with the through holes which were first drilled on the opposing side of the door. The through holes must be spaced vertically at a precise distance of 2.75 inches center-to-center, in accordance with specification standards set by lock manufacturers in cooperation with the construction or building industry. If the through holes are not precisely positioned or if misaligned, the door may be so damaged or defective that it cannot be used. The visual alignment process is apparently time-consuming besides being subject to human error. If the installer needs to install a large number of doors, which occurs with multiple dwellings or office buildings, the problems associated with preparing the through holes are exacerbated.

SUMMARY OF THE INVENTION

An object of this invention is to provide an alignment tool to aid in rapid and precise drilling of through holes in a door to enable mounting a lock assembly to the door.

According to this invention, a tool for enabling rapid and precise positioning of through holes which are used for attaching lock assemblies to doors comprises an adjustable bracket to enable rapid and positive location of the tool relative to the mortise formed in the door to be installed. When the adjustable bracket is positioned firmly against the inner flanged portion of the mortise, a bushing support plate is consequently positioned precisely against the face of the door adjacent to the cylinder bore. The bushing support plate, which is orthogonally disposed relative to the adjustable bracket, is formed with two vertically spaced holes defined by the bushings that are used as guides for drilling through holes in the door to which a lock assembly is to be mounted. An angle element coupled between the adjustable bracket and support plate effectively translates the centerline location of the mortise and plunger bore from the edge of the door to the face of the door at the location of the cylinder bore.

BRIEF DESCRIPTION OF THE DRAWING

The invention will be described with reference to the drawing in which.

Similar numerals refer to similar elements throughout the drawing.

DETAILED DESCRIPTION OF THE PREFERRED EMBODIMENT

Figure 3:
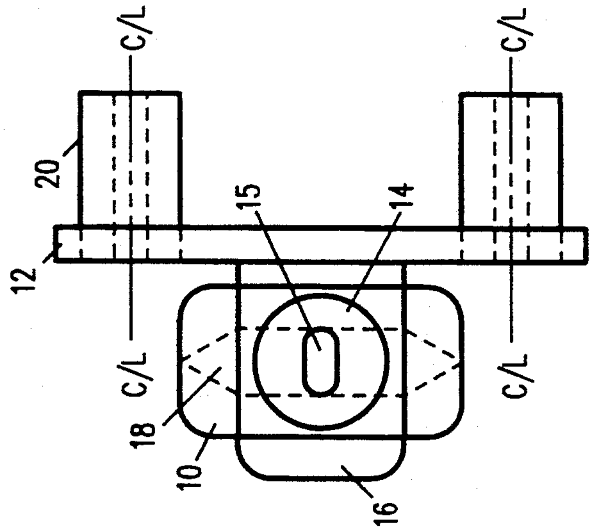
FIG. 3 is a rear view looking at the opposite end of the tool.
Figure 2:
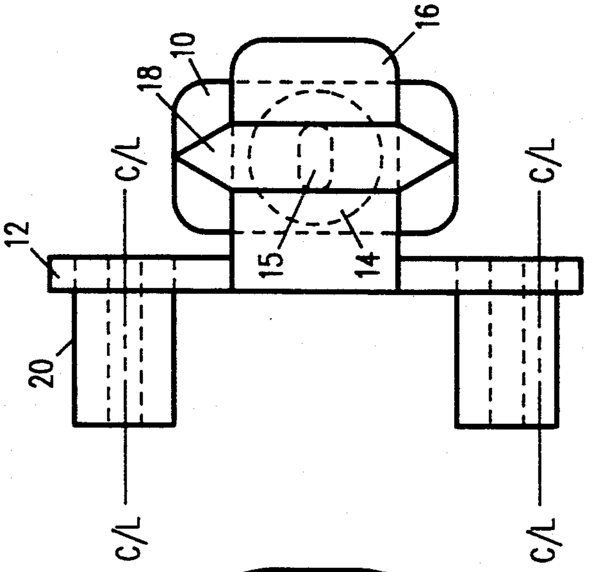
FIG. 2 is a front view looking towards the handle of the tool.
Figure 1:
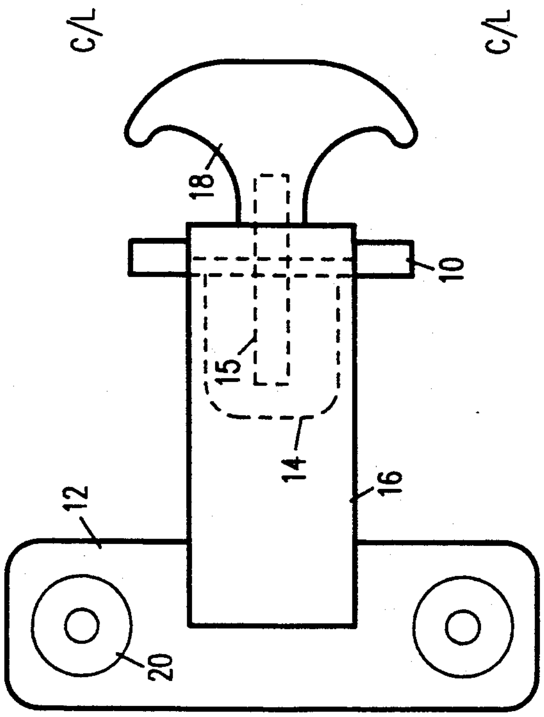
FIG. 1 is a top plan view of the alignment tool, made in accordance with this invention.
Figure 6C:
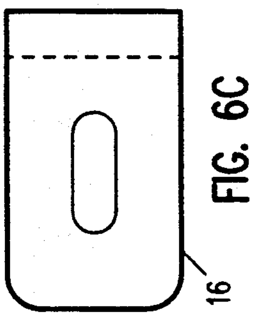
FIGS. 6A, 6B and 6C respectively are a side view, the side view rotated 90° , and a top view of the angle element used for locating the support plate relative to the adjustable bracket.
Figure 6B:
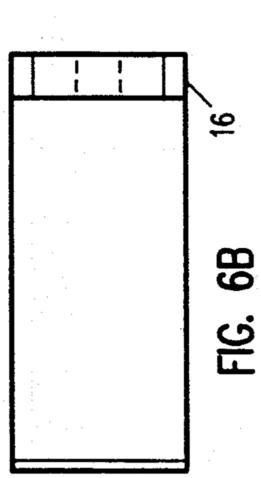
Figure 6A:
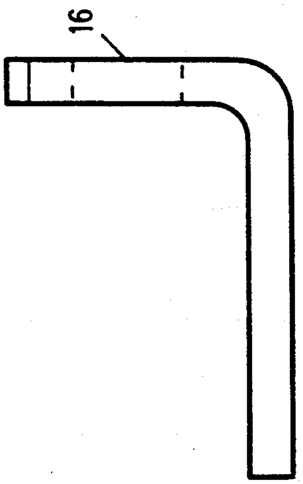
Figure 5B:
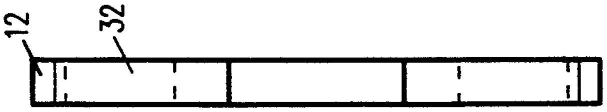
FIGS. 5A and 5B respectively are plan and side views of the bushing support plate formed with the tool.
Figure 5A:
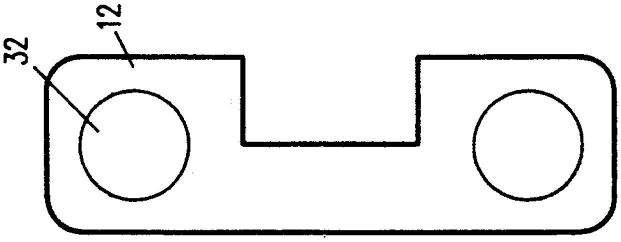

With reference to the drawing, an alignment tool useful for mounting a lock assembly to a door includes a rectangular bushing support plate 12 which has two vertically spaced bushings 20 that are disposed in holes 32. The bushings 20, which are made of hardened steel, are about one inch long and have an outer diameter of 0.750 inch and an inner diameter of about 0.312 inch. The support plate 12 is joined to a 90° angle element 16. Disposed centrally relative to one leg of the angle element 16 is a dowel pin 14, made of aluminum for example, which is about 1.25 inches long and 1 inch in diameter and has a radius of 0.25 inch at its projecting end.

Figure 4B:
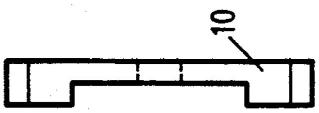
FIGS. 4A and 4B respectively are plan and side views of the adjustable bracket used with the inventive tool.
Figure 4A:
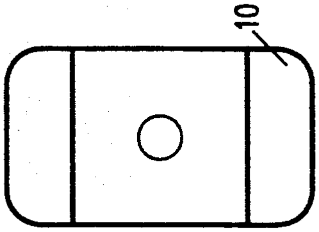

An adjustable bracket 10 is located between the dowel pin 14 and a T-shaped handle 18. The adjustable bracket 10 has a recessed portion, as shown in FIG. 4B, that serves as a locating slot to engage the angle element 16. A longitudinal steel stud 15 engages a countersunk threaded hole formed within the dowel pin 14, the adjustable bracket 10 and the T-handle 18 to secure these parts in a close assembly. The stud 15 is about one inch in length and has a ¼×20 thread to engage the threaded hole. The bracket 10, support plate 12, angle element 16 and stud 15 are all made of a rigid cold rolled steel material.

When the door installer uses the alignment tool to prepare the door with precisely spaced through holes, the installer grasps the handle 18 and inserts the aluminum dowel pin 14 into the mortise and plunger bore opening. The handle 18 is rotated counterclockwise about the threaded stud 15 to loosen the tool assembly. The adjustable bracket 10 can then be moved from side to side to adjust for the thickness of the door until the adjustable bracket 10 is positioned in line with the mortise opening and flush with the edge of the door. The adjustable bracket 10 in combination with the interior flanged section of the mortise limits the extent of penetration of the dowel pin into the mortise and plunger bore area. The handle 18 is then rotated clockwise so that the tool assembly is tightened and fastened in place. At this point, the vertical and horizontal centerlines of the mortise and plunger bore are precisely aligned with the respective centerlines of the adjustable bracket 10. With the bracket 10 in position, the angle element 16 serves to translate the vertical and horizontal centerlines position of the bracket 10 to the bushing support plate 12, so that the support plate is located at the corresponding centerlines of the cylinder bore.

The holes 32 delineated by the bushings 20 now define the precise location necessary for the installer to drill the through holes in the face of the door. After one set of through holes is completed on one face of the door, the symmetrically formed alignment tool is removed and turned so that the support plate is positioned against the other face of the door, with the adjustable slidable bracket 10 inserted in the mortise space at the edge of the door. The bushings 20 and guide holes 32 are now in precise alignment with the through holes first drilled in the opposing face of the door. At this point, the installer drills the through holes so that a continuous linear channel is provided for inserting and fastening the longitudinal bolts that hold the door lock assembly in place.

By virtue of the alignment tool disclosed herein, a significant savings in labor and a minimization of damaged doors are realized. It should be understood that the invention is not limited to the specific materials, dimensions or design set forth above, but may be modified within the scope of the invention.

What is claimed is:

1. An alignment tool for preparing a door with through holes used for mounting a lock assembly to the door, which has a cylinder bore extending from one face to the other face of the door and a mortise and plunger bore formed at the edge of the door comprising:

a support plate having spaced bushings defining guide holes for aligning said through holes at a precise distance apart;

an adjustable bracket for seating within said mortise; and means connecting said bracket and said support plate for translating the centerline position of said bracket, relative to said mortise and plunger bore, to the centerline position of said support plate relative to said cylinder bore.

2. An alignment tool as in claim 1, wherein said connecting means is an angle element formed with two orthogonally disposed segments.

3. An alignment tool as in claim 2, including a slot formed in one segment of said angle element for allowing movement of said adjustable bracket.

4. An alignment tool as in claim 2, wherein said bracket, said plate and said angle element are made from cold rolled steel.

5. An alignment tool as in claim 1, including a rotatable handle coupled at one end of said tool to said adjustable bracket for freeing said bracket to enable side-to-side movement of said bracket so that said bracket can be seated in said mortise, and for fastening said bracket in position within said mortise.

6. An alignment tool as in claim 5, wherein said handle is formed with a T-shape grasp portion.

7. An alignment tool as in claim 5, including a dowel pin coupled to said bracket and said handle for providing rapid and positive location of said plunger bore.

8. An alignment tool as in claim 7, including a threaded hole formed through said handle, bracket and dowel pin; and a longitudinal threaded stud for engaging said threaded hole and for holding said handle, bracket and pin in close assembly.

9. An alignment tool as in claim 1, wherein said guide holes are spaced precisely at 2.75 inches center to center.

10. An alignment tool as in claim 1, wherein said guide holes are aligned with the vertical centerline of said support plate and symmetrically spaced from the horizontal centerline of said support plate.

* * * * *